United States Patent
Nagata et al.

(10) Patent No.: US 6,919,701 B2
(45) Date of Patent: Jul. 19, 2005

(54) ROBOT CONTROLLER

(75) Inventors: Hideo Nagata, Kitakyushu (JP);
Yasuyuki Inoue, Kitakyushu (JP);
Ken'ichi Yasuda, Kitakyushu (JP);
Toshiyuki Kurebayashi, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 10/130,283

(22) PCT Filed: Nov. 29, 2000

(86) PCT No.: PCT/JP00/08463
§ 371 (c)(1),
(2), (4) Date: May 29, 2002

(87) PCT Pub. No.: WO01/38048
PCT Pub. Date: May 31, 2001

(65) Prior Publication Data
US 2003/0025473 A1 Feb. 6, 2003

(30) Foreign Application Priority Data
Nov. 29, 1999 (JP) .......... 11-338789

(51) Int. Cl.$^7$ .......... G05B 19/39
(52) U.S. Cl. .......... 318/568.12; 318/568.19; 318/568.22; 901/1
(58) Field of Search .......... 318/567, 568.12, 318/568.19, 568.22, 432–434, 568.18; 901/1

(56) References Cited

U.S. PATENT DOCUMENTS

| | | | | |
|---|---|---|---|---|
| 4,801,856 A | * | 1/1989 | Wajima | 318/568.22 |
| 4,808,063 A | * | 2/1989 | Haley | 414/730 |
| 4,967,125 A | * | 10/1990 | Hara | 318/568.11 |
| 4,973,895 A | * | 11/1990 | Torii et al. | 318/567 |
| 5,742,138 A | | 4/1998 | Kato et al. | |
| 5,781,705 A | * | 7/1998 | Endo | 700/262 |
| 5,994,864 A | * | 11/1999 | Inoue et al. | 318/568.2 |
| 6,515,442 B1 | * | 2/2003 | Okubo et al. | 318/560 |

FOREIGN PATENT DOCUMENTS

| | | |
|---|---|---|
| JP | 3-131485 | 6/1991 |
| JP | 9-174470 | 7/1997 |
| JP | 11-149304 | 6/1999 |

* cited by examiner

Primary Examiner—Rina Duda
(74) Attorney, Agent, or Firm—Westerman, Hattori, Daniels & Adrian, LLP

(57) ABSTRACT

A robot controller for keeping the posture of a tool in a task coordinate system by a simple processing and allowing a robot to perform flexible translational motion. A robot controller for controlling a motor for driving a joint by a control circuit having a position/speed state feedback loop, has a mechanism for measuring the angle of a joint of a robot, a mechanism for storing the initial posture of a tool attached to the end of a hand of the robot, a mechanism for setting the position or speed gain of a specific joint axis smaller than the position or speed gains of the other joint axes, and a mechanism for calculating the correction of a position or speed command to keep the tool posture with respect to the robot base on the basis of the angle of the joint and the initial posture of the tool.

10 Claims, 12 Drawing Sheets

Notes

A: Position/speed loop of task coordinate system

B: Static correspondence formula

C: Position/speed loop of joint coordinate system

Notes

A: Tool initial posture storage means

B: Correction calculating means

C: $J^T$ calculation

Task coordinate system

ROBOT CONTROLLER

TECHNICAL FIELD

The present invention relates to a control system for a robot and the like, and particularly, to a robot controller which can, while keeping the posture of a tool attached to the end of a hand of a robot, perform flexible translational motion, and a robot controller which can separately add flexible characteristics in a task coordinate system.

BACKGROUND ART

A prior-art robot has been controlled by a position/speed control system as shown in FIG. 13. Namely, a control system has been used, wherein a deviation between a speed command, which has been obtained by multiplying, by a position gain $K_P$, a deviation between a position command and a position feedback signal detected by a position sensor, and a speed feedback signal, which has been obtained by differentiating the position feedback signal, is multiplied by a speed gain $K_V$, proportional plus integral actions are performed, and the result is amplified by an amplifier to drive a joint motor.

When a task involving a contact with a workpiece is performed with such a control system, if workpiece displacement or the like exists, great torque is generated due to effects of the gains $K_P$ and $K_V$ which have been set great to improve rigidity and an integrator, therefore, execution of the task becomes difficult.

As an example, a description will be given based on a task to extract a workpiece as a die casting from a die-casting machine by grasping it with a robot tool.

When a workpiece is forcibly extruded from a die casting machine by a hydraulic cylinder, great torque is generated in a robot using a high-gain control system, therefore, the prior-art robot cannot extract the workpiece while grasping it. For a robot to perform such a task, appropriate flexible compliance motion becomes necessary.

Also, for a robot to perform such a die-cast handling task, appropriate flexible translational motion becomes necessary in a task coordinate system. This is mainly because external force from external apparatuses acts linearly and the shape of an object of contact is composed of lines and planes.

To cope with such problems, for example, in a prior art disclosed in Japanese Unexamined Patent Publication No. Sho-58-45891, a method exits, wherein dedicated compliance tools are utilized to absorb working force.

In addition hereto, in a prior art disclosed in Japanese Unexamined Patent Publication No. Sho-63-139678, a method exists, wherein working force is detected by means of a force sensor and force control is performed in the direction thereof.

Moreover, as a method for performing flexible control without adding special devices to a robot, in a prior art disclosed in Japanese Unexamined Patent Publication No. Hei-6-332538, a control method has been disclosed, wherein flexibility setting is possible in a joint coordinate system.

Moreover, in recent years, as a method for performing flexible control in a task coordinate system, in a prior art disclosed in Japanese Unexamined Patent Publication No. Hei-8-227320, a control method has been disclosed, wherein flexibility setting is possible in a task coordinate system.

Furthermore, in a prior art disclosed in Japanese Unexamined Patent Publication No. Hei-8-155868, a method has been disclosed, wherein the current position of a vector component specified in a tool coordinate system is successively transformed into a command value.

However, the aforementioned prior art had the following problems.

In the method disclosed in Japanese Unexamined Patent Publication No. Sho-58-45891, it is necessary to prepare dedicated tools to meet various tasks, therefore, weight capacity of a robot is reduced by the weight of the dedicated tools.

In addition, in the method described in Japanese Unexamined Patent Publication No. Sho-63-139678, a force sensor is necessary, and the system becomes complicated by loading the force sensor. Moreover, mechanical strength of the force sensor is low compared to that of the robot, therefore, if external force over the allowable torque of the force sensor acts, this poses a risk of a fracture of the force sensor.

Moreover, in the method described in Japanese Unexamined Patent Publication No. Hei-6-332538, in which a method for controlling flexibility in a joint coordinate system has been disclosed, since each joint axis independently and flexibly moves due to a gain reduction, it is difficult for a teaching operator of a robot to find the synthesized flexible direction and flexibility. Moreover, in a case where the posture of a robot has been changed because of, for example, being pushed by an external apparatus, the flexible direction of translation in the task coordinate system also changes, and motion to keep the posture of a tool cannot be performed. Therefore, a problem exists such that unexpected force such as a twist acts on a workpiece, causing a fracture if the workpiece is a die casting or the like having a complicated shape and low rigidity. Furthermore, since flexibility is provided at each joint axis in a circular fashion, even if the flexible motions are synthesized, flexible translational motion in the task coordinate system cannot be performed to perfection.

Moreover, in the method described in Japanese Unexamined Patent Publication No. Hei-8-227320, in which a control method for controlling flexibility in a task coordinate system has been disclosed, since it is necessary to determine a gain by making displacement of the joint coordinate system correspond to displacement of the task coordinate system, the relational formula for calculation becomes extremely intricate and a calculating load to the CPU becomes great, consequently, a gain cannot be continuously determined in response to changes in posture of the robot. In particular, in a robot posture, such as in the vicinity of a singular point, where the rate of change in the correspondence of displacement is great between the joint angle and task coordinates, a great calculating load acts on the CPU. Moreover, problems exist such that since real-time calculating cannot be performed in response to changes in posture of the robot and continuous gain calculating is difficult, flexibility of the robot is widely different depending on the posture of the robot.

Furthermore, in the method described in Japanese Unexamined Patent Publication No. Hei-8-155868, the angle of each axis whose position has been changed by external force is taken in real time, the current position of a position/posture in a specified tool coordinate system is calculated (orderly transformation), and only the current position of a specified vector component is transformed into a command value (inverse transformation). However, orderly transformations for all axes of the robot and inverse transformations of renewed command values are necessary in real time, the volume of calculations is great and the processing time is long.

DISCLOSURE OF THE INVENTION

In light of the above, it is an object of the present invention to provide a robot controller to keep the posture of a tool in a task coordinate system by simple processing and allowing a robot to perform flexible translational motion.

First means for achieving the above object is a robot controller for controlling a motor for driving a joint by means of a control circuit having a position/speed state feedback loop comprising:

means for measuring the angle of a joint of a robot, means for storing the initial posture of a tool attached to the end of a hand of the robot, means for setting the position or speed gain of a specific joint axis smaller than the position or speed gains of other joint axes, and means for calculating the correction of a position or speed command to keep the tool posture with respect to the robot base on the basis of the angle of the joint and the initial posture of the tool.

In addition, a second means for achieving the above object is a robot controller for controlling a motor for driving a joint by means of a control circuit having a position/speed state feedback loop comprising:

means for measuring the angle of a joint of a robot, means for storing the initial posture of a tool attached to the end of a hand of the robot, means for calculating a static correspondence between the coordinate systems based on the joint angle, means for performing second position/speed feedback control based on the joint angle and a position command in a robot task coordinate system in addition to the control circuit, means for setting the position or speed gain of a specific axis in the second feedback control system smaller than the position or speed gains of other joint axes, means for transforming an output value from the second feedback control system to a joint angle torque value by utilizing the static correspondence, means for adding the joint angle torque value of the second feedback control system to an output value from the first feedback control system, and means for calculating the correction of a position or speed command to keep the tool posture with respect to the robot base on the basis of the angle of the joint and the initial posture of the tool.

Furthermore, a third means for achieving the above object is a motor controller for controlling the wrist position and posture of a robot comprising:

means for performing control of the wrist position by means of a task coordinate control system and means for performing control of the wrist posture by means of a joint coordinate control system.

As a fourth means for embodying this controller, the task coordinate control system comprises:

means for measuring the angle of a joint of a robot, means for calculating a static correspondence between the coordinate systems based on the joint angle, means for performing position and speed state feedback control based on the joint angle and a position command in a robot task coordinate system in a task coordinate system, and means for transforming an output value from the feedback control system to a joint angle torque value of a joint coordinate system by utilizing the static correspondence.

In addition, as a fifth means, the task coordinate system comprises:

means for measuring the angle of a joint of a robot, means for calculating a correspondence of minute displacement between coordinate systems based on the joint angle, means for performing position state feedback based on the joint angle and a position command in a robot task coordinate system in a task coordinate system, means for transforming an output value from the position feedback control system to a speed command of a joint coordinate system by utilizing the correspondence of minute displacement, and means for performing speed state feedback control in a joint coordinate system based on the speed command and the joint angle.

BEST MODE FOR CARRYING OUT THE INVENTION

Hereinafter, embodiments for carrying out the present invention will be described.

Figure 1:
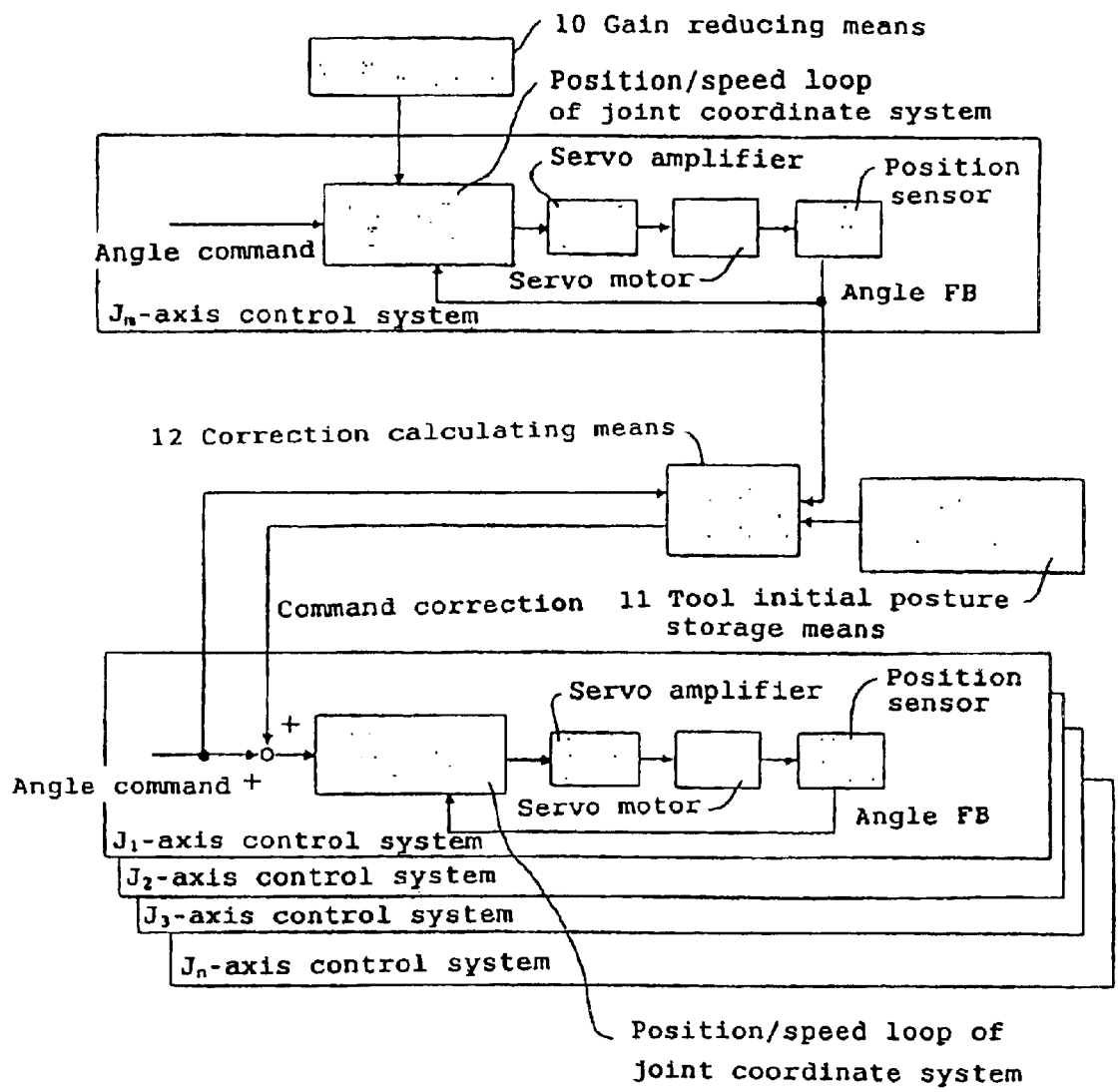
FIG. 1 is a block diagram showing a first basic construction of the present invention.

According to a first embodiment for carrying out the present invention, as shown in FIG. 1, in a robot controller for controlling a motor for driving a joint by means of a control circuit 40 having a position/speed state feedback loop, the position gain or speed gain of a specific joint axis $J_m$ is set, by a gain reducing means 10, smaller than the position gains or speed gains of other axes $J_1, J_2, J_3 \ldots J_n$ or a torque limit is performed. In a case where a specific joint axis flexibly moves because, for example, a robot is pushed by an external apparatus, an inverse transformation is performed so as to keep the initial posture of a tool which has been stored in advance in a tool initial posture storing means 11, and the correction is calculated by a correction calculating means 12 to correct a command.

Figure 4:
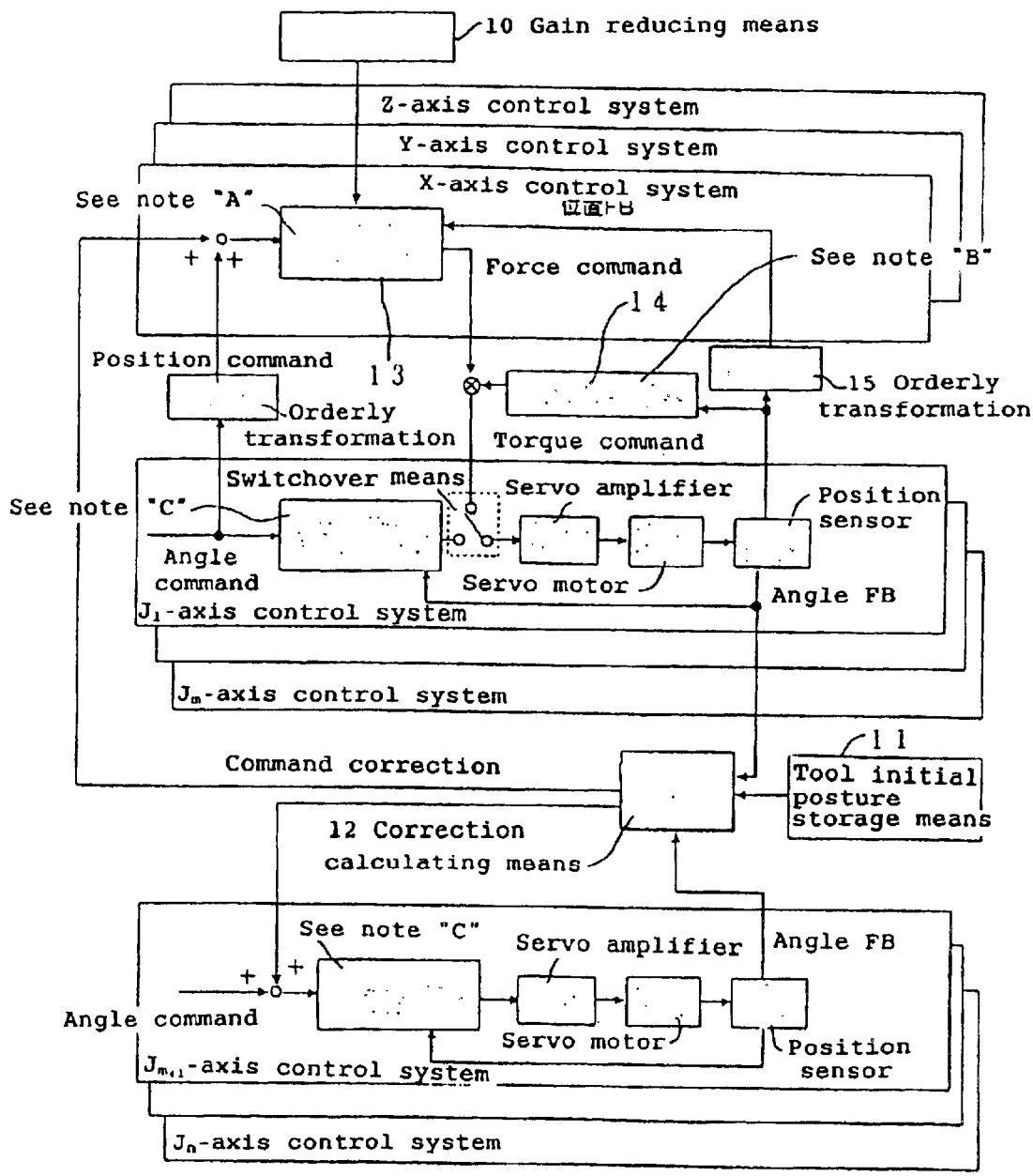
FIG. 4 is a block diagram showing a basic construction of a second means of the present invention.

In addition, as shown in FIG. 4, based on an angle command to a joint axis of a robot and a measured joint angle, a second position/speed state feedback loop 13 in a task coordinate system is constructed in addition to a control circuit of a joint coordinate system. The position gain or speed gain of a specific axis in this second position/speed control system is set smaller than the position gains or speed gains of other axes, or a force limit and a torque limit are performed. Based on a measured joint angle, a formula of the static correspondence between the coordinate systems is calculated by a static correspondence formula-calculating means 14, the output from the second control system is transformed into joint angle torque, and the joint angle is added to a first control system. In a case where a robot flexibly moves in the direction of or around a specific axis along the task coordinate system because of, for example, being pushed by an external apparatus, an inverse transformation is performed to keep the initial posture of a tool stored in advance, and the correction is calculated to correct a command.

Figure 8:
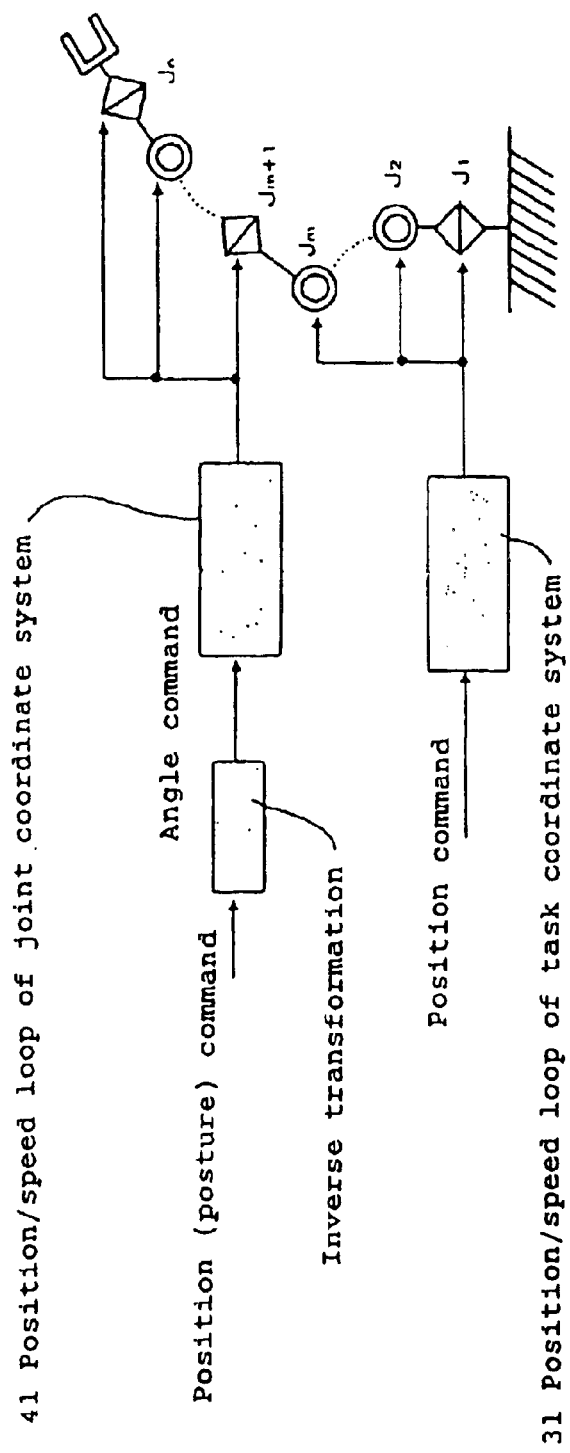
FIG. 8 is a block diagram showing a basic construction of a third means of the present invention.

Furthermore, according to the above second means for achieving the object, as shown in FIG. 8, in a motor controller for controlling the position and posture of a robot wrist, control of each robot axis is allotted to a task coordinate control system for controlling the wrist position and a joint coordinate control system for controlling the wrist posture. As component means of the task coordinate system, the following two types exist.

A first means constructs position and speed state feedback control in a task coordinate system based on a joint angle of a robot and a position command in the task coordinate system of the robot. An output value from this feedback control system can be transformed into a joint angle torque command of a joint coordinate system by means of a static correspondence between the coordinate systems calculated based on the joint angle.

A second means constructs position state feedback control in a task coordinate system based on a joint angle of a robot and a position command in the task coordinate system of the robot. An output value from this feedback control system can be transformed into a joint angle speed command of a joint coordinate system by means of correspondence of minute displacement between the coordinate systems calculated based on the joint angle. Based on this joint angle speed command and a joint angle, speed state feedback control is constructed in the joint coordinate system.

In state feedback control in each task coordinate system, by reducing the gain or limiting the output from each control system, flexible translational motion in the task coordinate system can be realized.

Hereinafter, embodiments of the present invention will be described.

Figure 2:
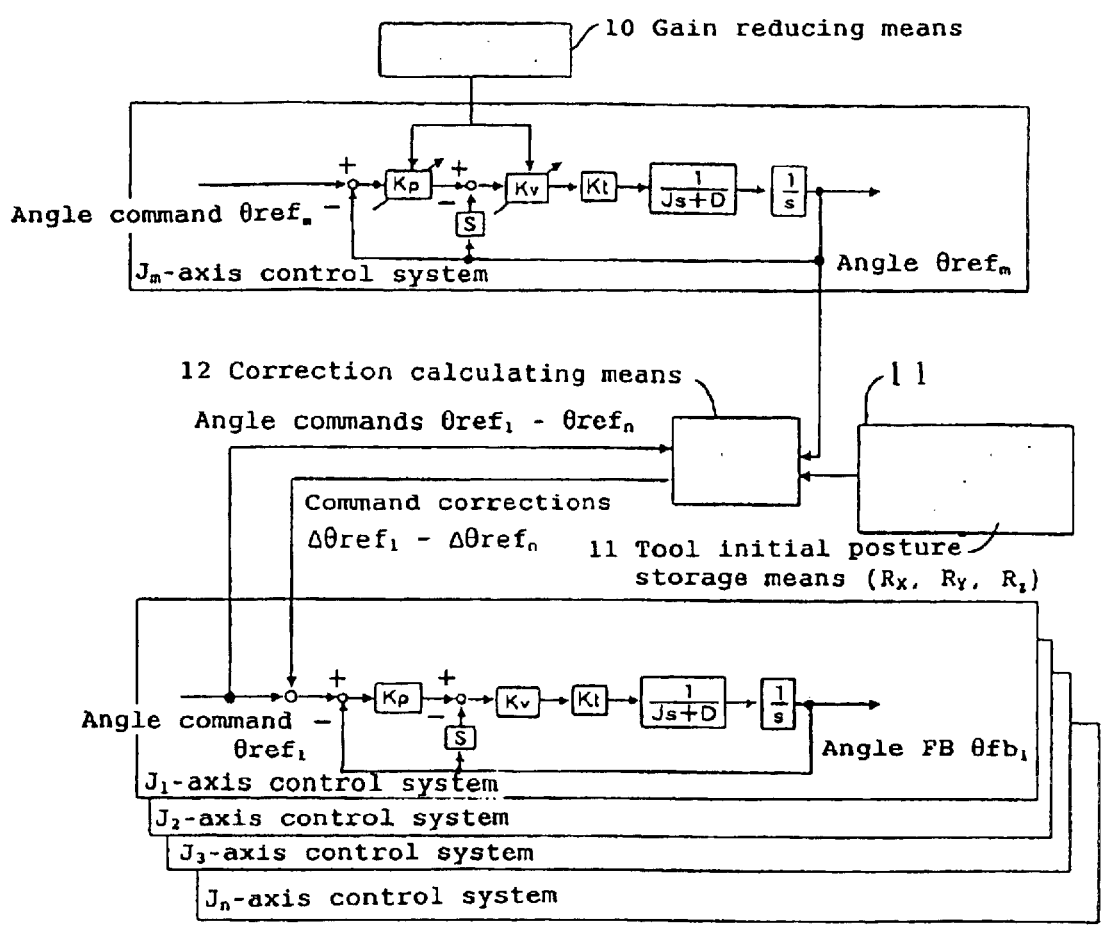
FIG. 2 is a block diagram showing a first concrete example of the present invention.

FIG. 2 shows a first concrete example, which is a control block diagram where control of the present invention has been applied to a position/speed control system in a normal joint coordinate system. In the internal loop for position/speed control in the joint coordinate system, proportional plus integral control is generally performed, however, force which regularly acts is to be compensated by a static compensating element.

In a general position/speed controlling state, due to effects of a position control loop and a speed control loop having high gains, each joint axis is not easily displaced with respect to force exerted from the outside. Herein, by reducing the position loop gain and speed loop gain, it becomes possible that each joint axis is flexibly displaced with respect to external force. However, if each joint of the robot individually and irregularly performs flexible motion, the flexible direction cannot be arbitrarily selected. Therefore, it becomes difficult to perform flexible translational motion while keeping the posture of a tool attached to the end of a hand of the robot.

Therefore, according to the control of the present invention, the control system of each joint is allotted to a conventional high-rigid position/speed loop and a low-rigid position/speed loop, based on the joint angle measured in a low-rigid joint axis and the initial posture of a tool, an angle correction to the high-rigid joint axis control system is calculated in real time so as to keep the tool posture with respect to the robot base. Namely, by displacing, according to the amount of displacement of a flexible axis, other axes, flexible translational motion becomes possible while the tool initial posture is kept. Hereinafter, a construction of the position/speed control loop of each joint will be described.

A robot joint has a degree of freedom of n, and an m-th axis $J_m$ (1=m=n) is set low in rigidity. Herein, no problem occurs if 2 axes or more are set low in rigidity. As a means for realizing low rigidity, by a gain reducing means 10, the position loop gain and speed loop gain of the $J_m$ axis are reduced below the position gains or speed gains of other axes. Alternatively, the torque command itself may be narrowed down small by providing a torque limit at the rear end of the control system. In such a case where the control system is made low in rigidity, static loads including gravity and the like are to be separately compensated.

Then, a tool posture angle $R_X$, $R_Y$, $R_Z$ in a task coordinate system to be used by a robot in an actual task is stored or set in a tool initial posture storage means 11. For this, a tool posture angle immediately before flexible motion is performed may be stored as a tool initial posture or, if the contents of a task are known in advance, a posture angle thereof may be inputted.

In an actual task, if external force acts on a tool attached to the end of a hand of a robot, only the $J_m$ axis as a flexible axis is displaced so as to follow the external force. Other axes are not displaced since the control systems are high in rigidity due to high loop gains. Herein, the value θfbm of an angle FB of the $J_m$ axis is measured by means of a joint angle measuring means (FB represents a feedback). Angle command corrections $?θref_1$–$?θrefn_n$ to $J_1$–$J_n$-axes other than the $J_m$ axis are determined by means of the calculated angle FB value of the $J_m$ axis, the tool posture angle $R_X$, $R_Y$, $R_Z$ stored or set when the task was carried out, and angle commands $θref_1$–$θrefn_n$ of the $J_1$–$J_n$-axes (excluding θfbm). At this time, the $J_1$–$J_n$-axes (excluding $J_m$) are high in rigidity and the angle FB with respect to the angle command always takes an approximately identical value, therefore, angle FBs $θref_1$–$θref_n$ may be used instead of the angle commands.

As a detailed method for determining the angle command corrections $?θref_1$–$?θref_n$ by means of a correction calculation means 12, a transformation formula, which is generally referred to as an inverse transformation or inverse kinematics, is used. This is usually a transformation formula for determining the angle of each joint based on the tool position and posture of the end of a hand of a robot. Since this transforming method has been mentioned in a great number of literary documents (for example, Tsuneo Yoshikawa, "Foundations of Robotics"), a description thereof will be omitted here.

A means for determining the angle command corrections $?θref_1$–$?θref_n$ will be shown below in due order.

(1) Based on the angle commands $\theta ref_1-\theta ref_n$ and angle FB$\theta$fbm, the position of a point (hereinafter, referred to as a "P point") as the center point of wrist axes in a task coordinate system is determined by means of a transformation formula, which is generally referred to as an orderly transformation or forward kinematics.

(2) Based on the determined P point position $T_X$, $T_Y$, $T_Z$ and tool posture angle $R_X$, $R_Y$, $R_Z$ stored before the task, new angle commands $\theta ref_1-\theta ref_n$ of the $J_1-J_n$-axes are determined by means of an inverse transformation formula.

(3) By determining finite differences from the current angle commands $\theta ref_1-\theta ref_n$, angle command corrections $?\theta ref_1-?\theta ref_n$ are determined and the angle command corrections are added to the angle commands of the $J_1-J_n$-axes.

By determining this calculation in real time, even if the $J_m$ axis is shifted due to external force, axes other than the $J_m$-axis move so that the initial posture of a tool is kept with respect to a robot base.

Figure 3:
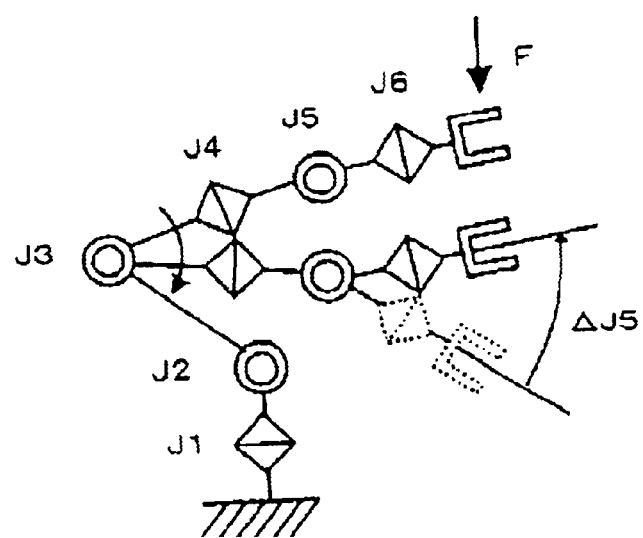
FIG. 3 is a skeleton diagram showing a first action of the present invention.

A description will be given by showing an example, in FIG. 3, where the present control method has been applied to a six-degree-of-freedom robot. An axis to be set flexible is determined as a $J_3$ axis, high loop gains are given to other $J_1$, $J_2$, $J_4$, $J_5$, and $J_6$-axes, thereby making the control system high in rigidity. It is presumed that force from the outside acts on a tool attached to the end of the robot hand in the vertical downward direction.

When the vertical downward force is applied to the tool, the only flexible $J_3$ axis is displaced in the downward direction (clockwise on the sheet surface). The other axes are not displaced since the control system is highly rigid. Accordingly, the tool results in a posture drawn by dotted lines, and consequently, the tool posture is changed downward.

Therefore, by performing the following calculation, the posture of the $J_5$ axis is corrected, whereby flexible motion can be nearly translationally performed while the tool position is kept.

(1) Based on the position commands $\theta ref_1-\theta ref_n$ and position FB$\theta$fb$_3$, an orderly transformation formula with respect to a P point at the center of a wrist axes is calculated, and the position of the P point $T_X$, $T_Y$, $T_Z$ in a task coordinate system is determined.

(2) With the determined position of the P point $T_X$, $T_Y$, $T_Z$ and tool posture angle $R_X$, $R_Y$, $R_Z$, a new angle command of the $J_5$ axis is determined by means of an inverse transformation formula. First, based on the tool posture angle $R_X$, $R_Y$, $R_Z$, a rotation matrix ROT for (3,3) is determined. By use of expressions including an XYZ-fixed angle, this can be expressed as follows. It is provided that $$ROT(R_X, R_Y, R_Z) = \begin{bmatrix} cR_YcR_Z, & sR_XsR_YcR_Z - cR_YsR_Z, & cR_XsR_YcR_Z + sR_XsR_X \\ cR_YsR_Z, & sR_XsR_YsR_Z + cR_YcR_Z, & cR_XsR_YcR_{Z'} - sR_XsR_Z \\ -sR_Y, & sR_XcR_Y, & cR_XcR_Y \end{bmatrix} = \begin{bmatrix} N_X, & O_X, & A_X \\ N_Y, & O_Y, & A_Y \\ N_Z, & O_Z, & A_Z \end{bmatrix} \quad (1)$$

Herein, $cR = \cos R$, and $sR = \sin R$.

Then, a new angle command $\theta ref_5$ is determined by an arcsine.

$$\theta ref_5 = \tan^{-1}\{(-c\theta ref_1 s\theta \alpha c\theta ref_4 + s\theta ref_1 s\theta ref_4)A_X - \quad (2)$$
$$(-s\theta ref_1 s\theta \alpha c\theta ref_4 + c\theta ref_1 s\theta ref_4)A_Y + c\theta \alpha c\theta ref_4 A_Z)/$$
$$(c\theta \alpha (c\theta ref_1 A_X + s\theta ref_1 A_Y) + s\theta \alpha A_Z)\}$$

Herein, $\theta \alpha$ is an angle with respect to a horizontal plane of a link $J_3-J_5$, which can be determined based on $J_2$ and $J_3$. That is, (3) By determining a finite difference from the current angle command $\theta ref_5$, an angle command correction $?\theta ref_5$ can be determined, and this angle command correction is added to the angle command of the $J_5$ axis.

Herein, if the amount of displacement of the P point is sufficiently small with respect to the distance from $J_8$ to a external force acting point of the tool, this can be considered as flexible translational control, however, if a longer stroke is desirable, a method is employed, which will be described below.

A second concrete example of the present invention will be described with reference to FIG. 4.

In terms of the control method, the second concrete example is the same as the first concrete example, however, it is an object thereof to securely carry out flexible translational motion. In order to carry out flexible translational motion, a P point as the wrist center performs translational motion. In order to carry out translational motion of the P point in a task coordinate system, a method is employed, wherein in addition to a usual joint coordinate system position/speed loop, a task coordinate system position/speed loop 13 is simultaneously used.

In the present example, in terms of the $J_1-J_m$-axes, by constructing a task coordinate position/speed loop 13 and performing flexible motion by this task coordinate system position/speed loop 13, it becomes possible to securely carry out flexible translational motion. In terms of the $J_{m+1}-J_n$ axes, control is performed by a conventional joint coordinate system position/speed loop.

Hereinafter, a method for constructing a task coordinate system position/speed loop 13 for 3 perpendicular axes and 3 rotation axes will be described.

Based on the information concerning an angle command and an angle FB on a position/speed loop in a joint axis system, a position command and a position FB with respect to a control point in a task coordinate system are determined by means of a relational formula between joint displacement and robot work position (block 15), which is generally referred to as an orderly transformation or forward kinematics. Based on the position command and position FB, a position/speed control loop 13 is constructed in the X-, Y-, and Z-axis directions and around the X, Y, and Z axes of the task coordinate system. Herein, output values from the position/speed control loop 13 of this task coordinate system are a force command in the X-, Y-, and Z-axis directions in the task coordinate system and a torque command around the X, Y, and Z axes. The position/speed control loop 13 of the task coordinate system reduces, by means of a gain reducing means 10, the position loop gain and speed loop gain of any control system of the X, Y, and Z axes to become lower than the position gains or speed gains of other axes. Alternatively, the force command or torque command itself may be narrowed down small by providing a torque limit at the rear end of the control system.

Thus, in a case where flexible translational motion of the P point is performed in only the direction of a specific axis on a task coordinate system in response to force exerted from the outside, the gains of its control system are reduced or the force is limited by a limit. Thereby, it becomes possible to allow a position deviation in the specific axis direction and not to allow a position deviation in the directions of other axes and around other axes.

Then, based on the current state of a robot, a static correspondence formula between the joint coordinate system and task coordinate system as a transposed matrix of a determinant, which is generally referred to as Jacobian, is determined in a block 14, and based on a force command and a torque command of the task coordinate system, a torque command in the joint coordinate system can be calculated.

For example, in a three-degree-of-freedom robot, a calculation formula for a Jacobian transposed matrix can be expressed by the following formula.

$$J^T = \begin{pmatrix} {}^0s_1 \times ({}^0Pr - {}^0P_1), & {}^0s_2 \times ({}^0Pr - {}^0P_2), & {}^0s_3 \times ({}^0Pr - {}^0P_3) \\ {}^0s_1, & {}^0s_2, & {}^0s_3 \end{pmatrix}^T \quad (3)$$

Herein,

J: Jacobian
$O_{Si}$: Rotating direction vector of an i-th joint coordinate (on the basis of a robot base coordinate system)
$O_{Pi}$: Position vector of the i-th joint (on the basis of a robot base coordinate)
x: Indicates a vector product
r: Working position vector of a robot
T: Represents matrix transposition Accordingly, the output value of a task coordinate system is $$F = [F_X, F_Y, F_Z]^T \quad (4)$$

Herein,

F: Force vector
$F_X, F_Y, F_Z$: Forces in the task coordinate system Joint angle torque values transformed into a joint coordinate system is $$\tau = [\tau_1, \tau_2, \tau_3]^T \quad (5)$$

Herein, where $\tau$: Torque vector in a joint coordinate system
$\tau_i$: Torque of the i-th axis joint coordinate system is provided, torque in the joint coordinate can be determined based on the following relationship.

$$\tau = J^T F \quad (6)$$

Accordingly, in response to a change in posture of the robot, a calculation of formulae (3) and (6) is carried out, and the torque command indicated in formula (5) is added to the torque command in the joint control system, whereby a flexible control system for a robot where flexible translational motion on a task coordinate system is possible in the whole motion area of the robot can be constructed.

Figure 5:
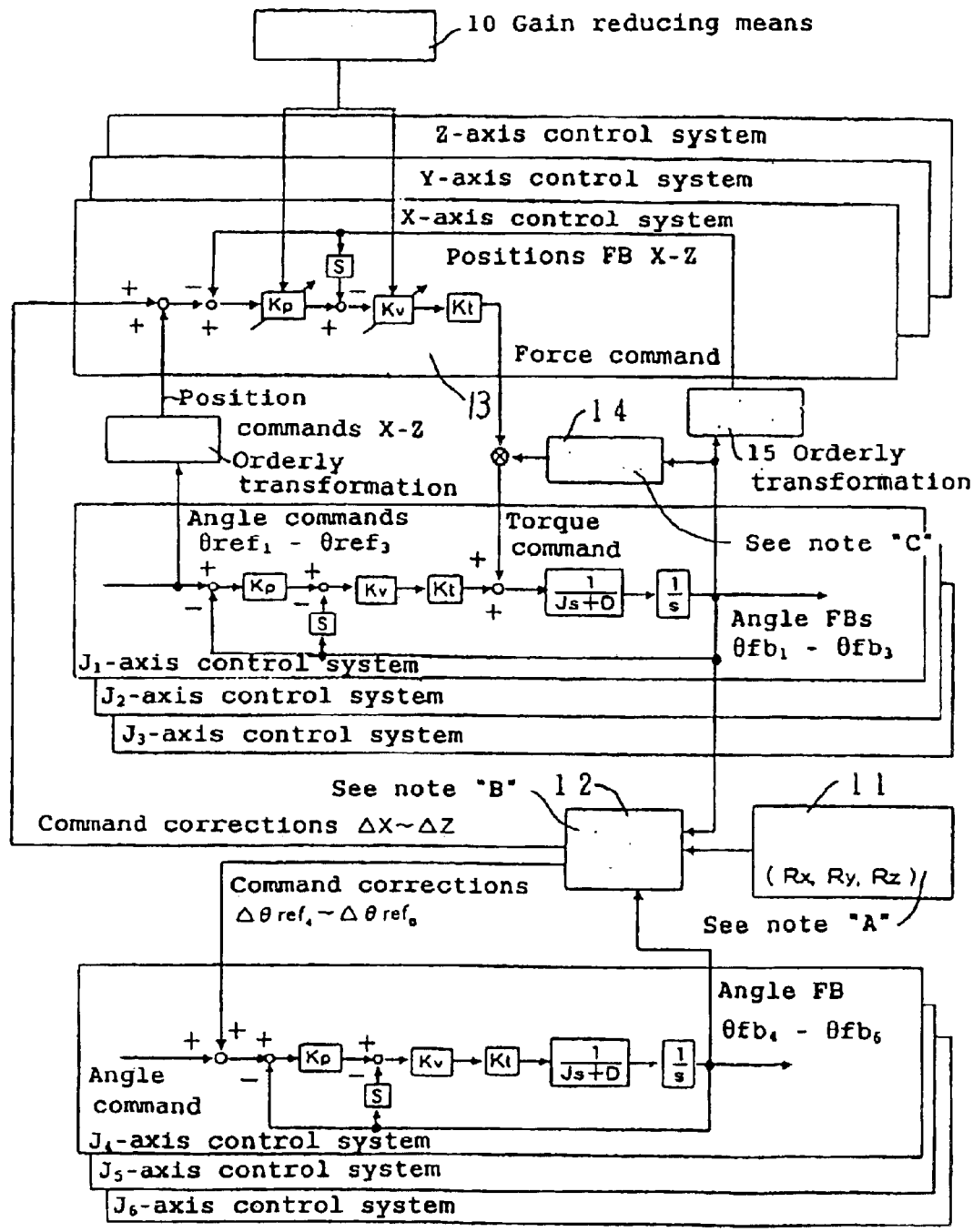
FIG. 5 is a block diagram showing a second concrete example of the present invention.

Now, a construction of a control system which has been applied to an actual robot is shown in FIG. 5, whereby actions of respective elements will be described. The degree of freedom of joints of a robot is provided as 6, separate control methods are activated between the $J_1$–$J_3$ axes and $J_4$–$J_6$ axes. In terms of the $J_1$–$J_3$ axes which control the position of a P point at the center of the wrist axes in a task coordinate system, a position/speed loop 13 of a task coordinate system is constructed. In terms of the $J_4$–$J_6$ axes which control the tool posture with respect to a P point at the center of the wrist axes in the task coordinate system, a position loop of a joint coordinate system is constructed. By thus separating control between the position and posture, flexible translational motion can be executed by position control and a correction of a change in posture of a tool can be executed by posture control.

(1) In order to construct a position/speed loop of a task coordinate system, a position command and a position FB concerning the P point in the task coordinate system are determined by utilizing an orderly transformation formula 15 based on angle commands $\theta\text{ref}_1$–$\theta\text{ref}_3$ of the $J_1$–$J_3$ axes and angle FBs $\theta\text{ref}_1$–$\theta\text{ref}_3$, separately.

(2) Based on the position command and position FB in the task coordinate system, a position/speed control loop is constructed in the X-, Y-, and Z-axis directions of the task coordinate system. Herein, the output value from the position/speed control loop of the task coordinate system becomes a force command in the X-, Y-, and Z-axis directions in the task coordinate system. The position/speed control loop of the task coordinate system reduces, by means of a gain reducing means 10, the position loop gain and speed loop gain of a control system in terms of any of the X, Y, and Z axes to become lower than the position gains or speed gains of other axes. Alternatively, the power command itself may be narrowed down small by providing a limit at the rear end of the control system.

Herein, it is presumed that flexible translational motion of the P point is performed in the X-axis direction of a task coordinate system. The position loop gain and speed loop gain of the X-axis control system of the task control system are reduced by a gain reducing means 10 to become lower than the position gains or position gains of other axes. Thus, the position of the P point can flexibly move in the X-axis direction due to external force, however, in the Y and Z-axis direction, since the position/speed loop of the task coordinate system is high in rigidity, force is generated so as not to create a deviation, therefore, motion is limited.

(3) Then, by the block 14, a static correspondence formula between a joint coordinate system and a task coordinate system is determined based on robot angle FBs $\theta\text{fb}_1$–$\theta\text{fb}_3$, and by utilizing a transposed determinant thereof, a torque command in a joint coordinate system is calculated based on the force command of the task coordinate system.

(4) By adding this torque command to the torque commands of the joint coordinate system of the $J_1$–$J_3$ axes, flexible translational motion in the X-axis direction of the P point in the task coordinate system and highly rigid motion in the Y- and Z-axis directions become possible. At this time, by setting the torque command from the position/speed loop 13 of the joint coordinate system of the $J_1$–$J_3$ axes to 0, interference of the torque commands can be prevented. Static loads including gravity are to be separately compensated.

A calculation method in a case where external force has actually acted on a tool on the end of a hand of a robot will be shown below. By flexible motion of the P point position in the X-axis direction, the angles of the $J_1$–$J_3$ axes are gradually changed, respectively. The angle FBs $\theta\text{fb}_1$–$\theta\text{fb}_3$ of these axes and angle FBs $\theta\text{fb}_4$–$\theta\text{fb}_6$ of the wrist axes $J_4$–$J_6$ are measured by a joint angle measuring means.

Based on the initial posture angle $R_X$, $R_Y$, $R_Z$ of a tool, which has been stored before the external force acts, and angle FBs θfb$_1$–θfb$_3$, by means of an inverse transformation formula, angle commands θref$_4$–θref$_6$ of the wrist axes whereby the tool posture keeps its initial posture can be newly determined. By calculating a finite difference between these new angle commands θref$_4$–θref$_6$ and current wrist angle FBs θfb$_4$–θfb$_6$ (or angle commands θref$_4$–θref$_6$), angle command corrections ?θref$_4$–?θref$_6$ can be determined. These angle command corrections ?θref$_4$–?θref$_6$ are added to the angle commands θref$_4$–θref$_6$.

An angle command θref$_5$ of the J$_5$ axis can be determined by formula (1). Angle commands θref$_4$ and θref$_6$ of the J$_4$ axis and J$_6$ axis can be determined by the following formulae.

$$\theta ref_4 = \tag{7}$$
$$\tan^{-1}\{(s\theta ref_1 A_X - c\theta ref_1 A_Y)/(c\theta \alpha A_Z - s\theta \alpha(c\theta ref_1 A_X + s\theta ref_1 A_Y))\}$$

$$\theta ref_6 = \tan^{-1}\{((c\theta ref_1 s\theta \alpha s\theta ref_4 + s\theta ref_1 c\theta ref_4)N_X + \tag{8}$$
$$(s\theta ref_1 s\theta \alpha s\theta ref_4 - c\theta ref_1 c\theta ref_4)N_y - c\theta \alpha s\theta ref_4 N_2)/$$
$$((c\theta ref_1 s\theta ref_4 + s\theta ref_1 c\theta ref_4)O_X +$$
$$(s\theta ref_1 s\theta \alpha s\theta ref_4 - c\theta ref_1 c\theta ref_4)O_Y - c\theta \alpha s\theta ref_4 O_2)\}$$

Since the volume of calculation of the above is extremely small, it is possible to find solutions in real time.

Figure 6:
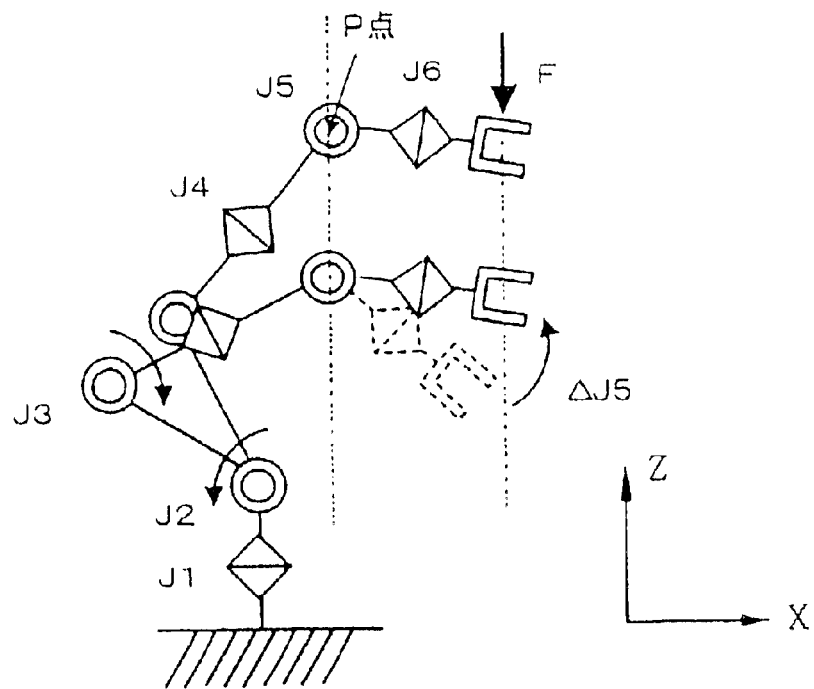
FIG. 6 is a skeleton diagram showing a second action of the present invention.

A description will be made by showing a motion example where the present control method has been applied to a six-degree-of-freedom robot is shown in FIG. 6.

An axis to be set flexible is provided as the Z axis of a task coordinate system, and high loop gains are set for other X and Y axes and the J$_4$–J$_6$ axes of wrist axes, thereby making the control system high in rigidity. It is presumed that force from the outside acts on a tool attached to the end of a hand of a robot in the vertical downward direction.

The P point as the center of the wrist axes moves, because of functions of a position/speed loop of a task coordinate system, in only the vertical direction (Z-axis direction) due to the action of the external force, and therefore shifts along the dotted lines shown in the drawing. The P point shifts downward, whereby the angle of the wrist axis (herein, the J$_5$ axis) becomes as shown by the dotted lines. However, ?J$_5$ is calculated according to a shift of the P point and the J$_5$ axis changes, and as a result, the J$_5$ axis becomes as shown by the solid lines while the tool initial posture with respect to a robot base is kept, and the tool shifts in parallel in the vertical direction. Namely, the tool also shifts along the dotted lines in the drawing. At this time, with respect to the wrist axis, the initial tool posture is only instructed, whereby making it possible to motion the robot so that the tool posture is kept according to translational motion of the P point.

Figure 7:
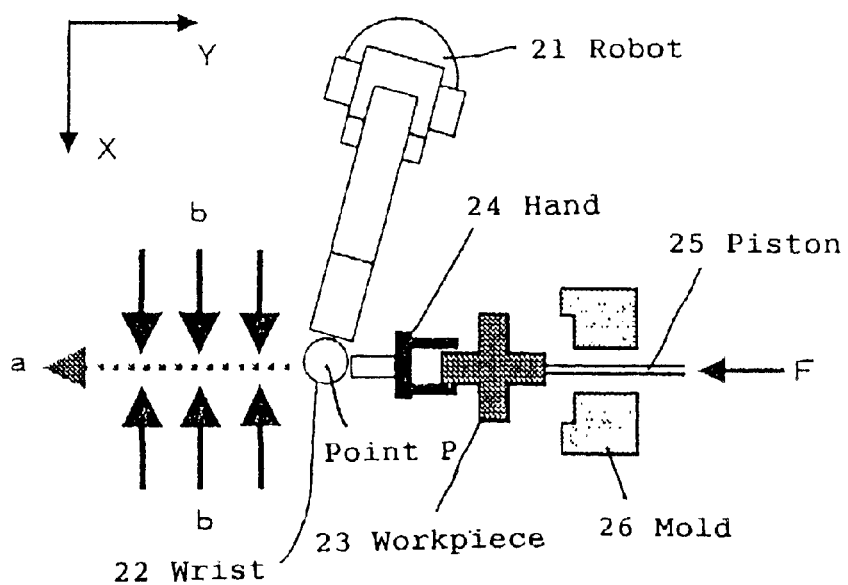
FIG. 7 is an explanatory view showing an application example of the present invention.

A description will be made by showing, for example, a case where the present invention has been applied to die-cast handling in FIG. 7. Die-cast handling is a work for taking out a workpiece 23 as a die casting from a die-casting machine by grasping the workpiece 23 with a tool 22 of a robot 21. While the robot 21 remains grasping the workpiece 23 with a hand 24, force F whereby the workpiece is pushed out from a die 26 by a piston 25 is set to a direction "a" along the Y axis of a task coordinate system, and the robot 21 must shift along the direction "a". In this case, if the robot moves in the direction "b" even slightly, torsional force acts on the workpiece 23, resulting in deformation or fracture in the die 26. Priorly, a mechanical structure such as a slider is attached to the hand 24 portion to absorb the force, therefore, weight capacity of the robot is reduced and much trouble occurs over the necessity of accurately teaching the direction of external force to the motion direction of the slider.

In the present example, a position/speed loop of a task coordinate system is constructed along the direction "a" and is set flexible in the Y-axis direction (a gain reduction or a force limit), whereby the P point flexibly moves only along the direction "a". The P point of the robot 21 is pushed out by the piston 25, however, since a correction to the wrist portion is calculated so as to keep the posture of the hand 24 in a task coordinate system, the workpiece 23 is pushed out straight from the die 26. At this time, the flexible direction and flexibility of the robot can be set not with the unit of a joint axis but in the task coordinate system, therefore, teaching work can be extremely simply carried out.

Now, a description will be made by showing a third concrete example of the present invention in FIG. 9.

Figure 9:
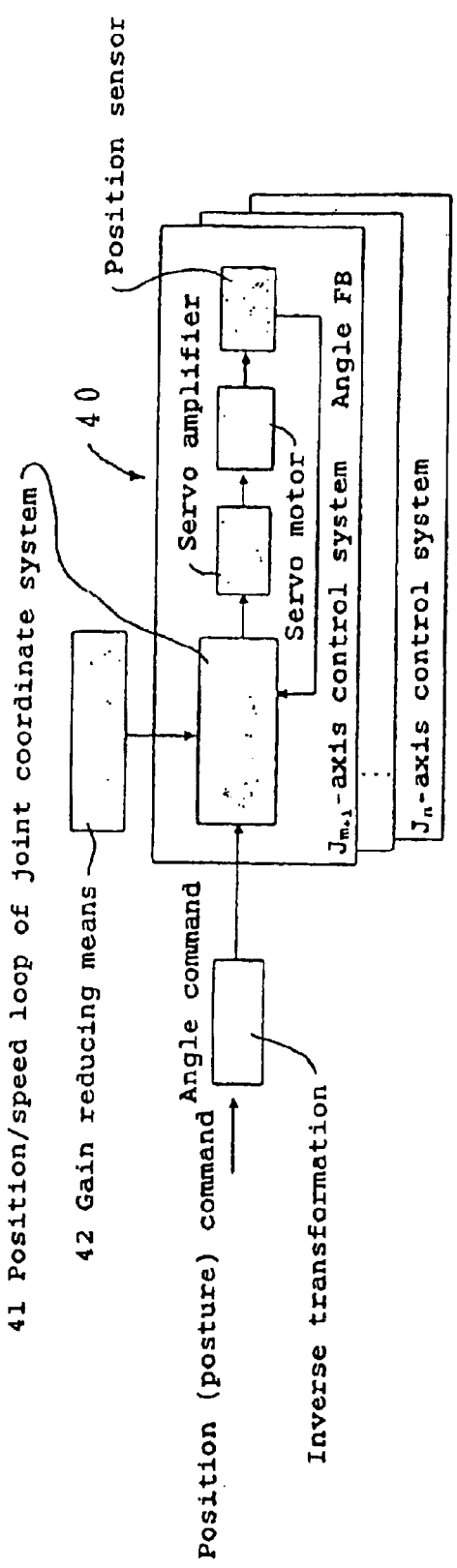
FIG. 9 is a block diagram showing a third basic construction of the present invention.
Figure 9:
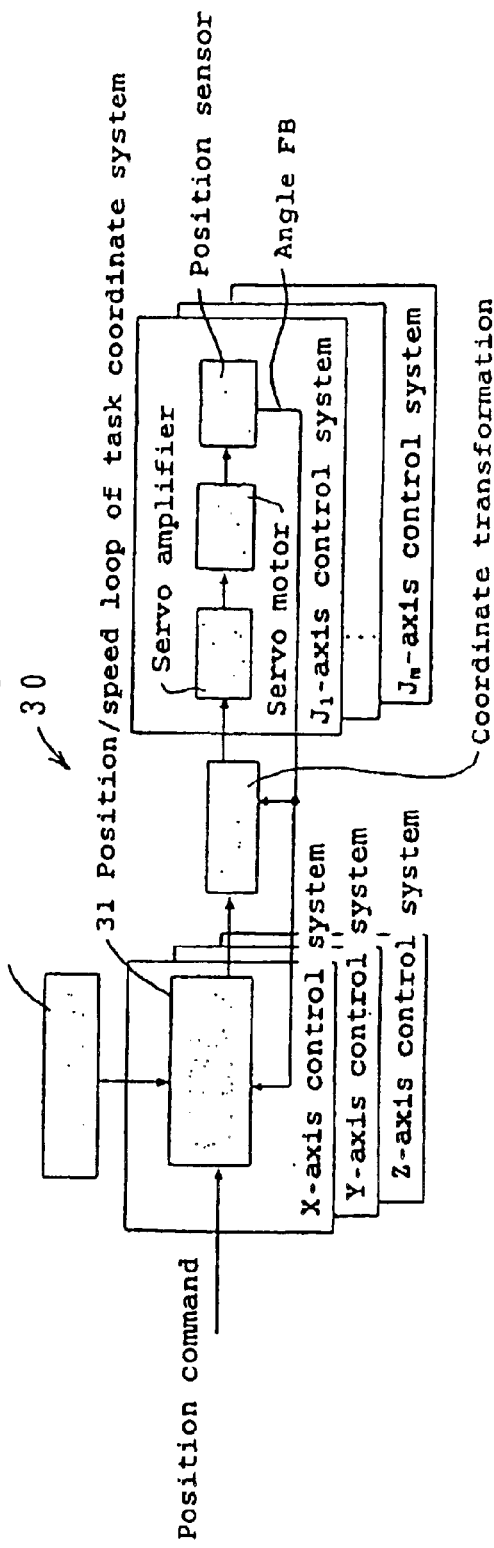

FIG. 9 shows a block diagram where control of the present invention has been applied to a position/speed control system in an ordinal joint coordinate system.

In the aforementioned example, the position/speed loop of a task coordinate system and a position/speed loop of a joint coordinate system were simultaneously used as a position control system of the P point.

Therefore, as control according to the present invention, the control system of each joint of a robot is completely allotted to a position/speed control system 30 of a perpendicular coordinate system for controlling the position (hereinafter, a P point) of the center point of a wrist axis and a position/speed control system 40 of a joint coordinate system for controlling the posture of a tool and a specific axis for position/speed control of the perpendicular coordinate system is made flexible, whereby flexible translational motion is made possible in a task coordinate system. By narrowing down the motion to translational motion excluding rotation and constructing a position/speed loop of only the perpendicular coordinate system, the volume of calculation can be reduced by half.

Hereinafter, a construction of the position/speed control loop of each joint in the present example will be described. The degree of freedom of joints of a robot is provided as n. Of these, a control system of the axes from the base of a robot to the m-th axis (hereinafter, referred to as basic axes) is constructed by a position/speed loop of a perpendicular coordinate system. A control system of m+1-th to n-th axes (hereinafter, referred to as wrist axes) is constructed by a position/speed loop 41 of a joint coordinate system. Component means of the perpendicular coordinate system determines a position FB concerning the wrist center point (hereinafter, referred to as a P point) in a task coordinate system based on an angle detection value of each joint of the basic axes by means of a relational formula between joint displacement and robot working position, which is generally referred to as an orderly transformation or forward kinematics. Based on the position FB and position command of the P point in a task coordinate system, a position/speed control loop is constructed in the X-, Y-, and Z-axis directions of the task coordinate system. Herein, an output value from the position/speed control loop of the task coordinate system becomes a force command to the X-, Y-, and Z-axis directions in the task coordinate system. The position/speed control loop of the task coordinate system reduces, by means of a gain reducing means 32, the position loop gain and speed loop gain of any control system of the X, Y, and Z axes to be lower than the position gains or speed gains of other axes. Alternatively, the force command itself may be narrowed down small by providing a limit at the rear end of the speed control system, which is not illustrated. In such a case where the control system is set low in rigidity, static loads including gravity are to be separately compensated.

Then, based on the current state of the robot, a static correspondence formula between a joint coordinate system and a task coordinate system as a transposed matrix of a matrix, which is generally referred to as Jacobian, is calculated, and based on the force command of the task coordinate system, a torque command in the joint coordinate system can be calculated. For this, the aforementioned formulae (3) through (6) are used, and in response to a change in posture of the robot, a calculation of formulae (3) and (6) is carried out, and the torque command indicated in formula (5) is added to the torque command in the joint control system, whereby a flexible control system for a robot where flexible translational motion on a task coordinate system is possible in the whole motion area of the robot can be constructed.

In the position control loop of a joint coordinate system of a wrist axis, position control is performed with high rigidity at a normal position loop gain and a normal speed gain, or flexible control is performed with low rigidity by reducing the position loop gain and speed loop gain to become lower than the position gains and speed gains of other axes. In addition, as a means for low rigidity, instead of a gain reduction, a limit may be provided after a speed controller, which is not illustrated.

Figure 10:
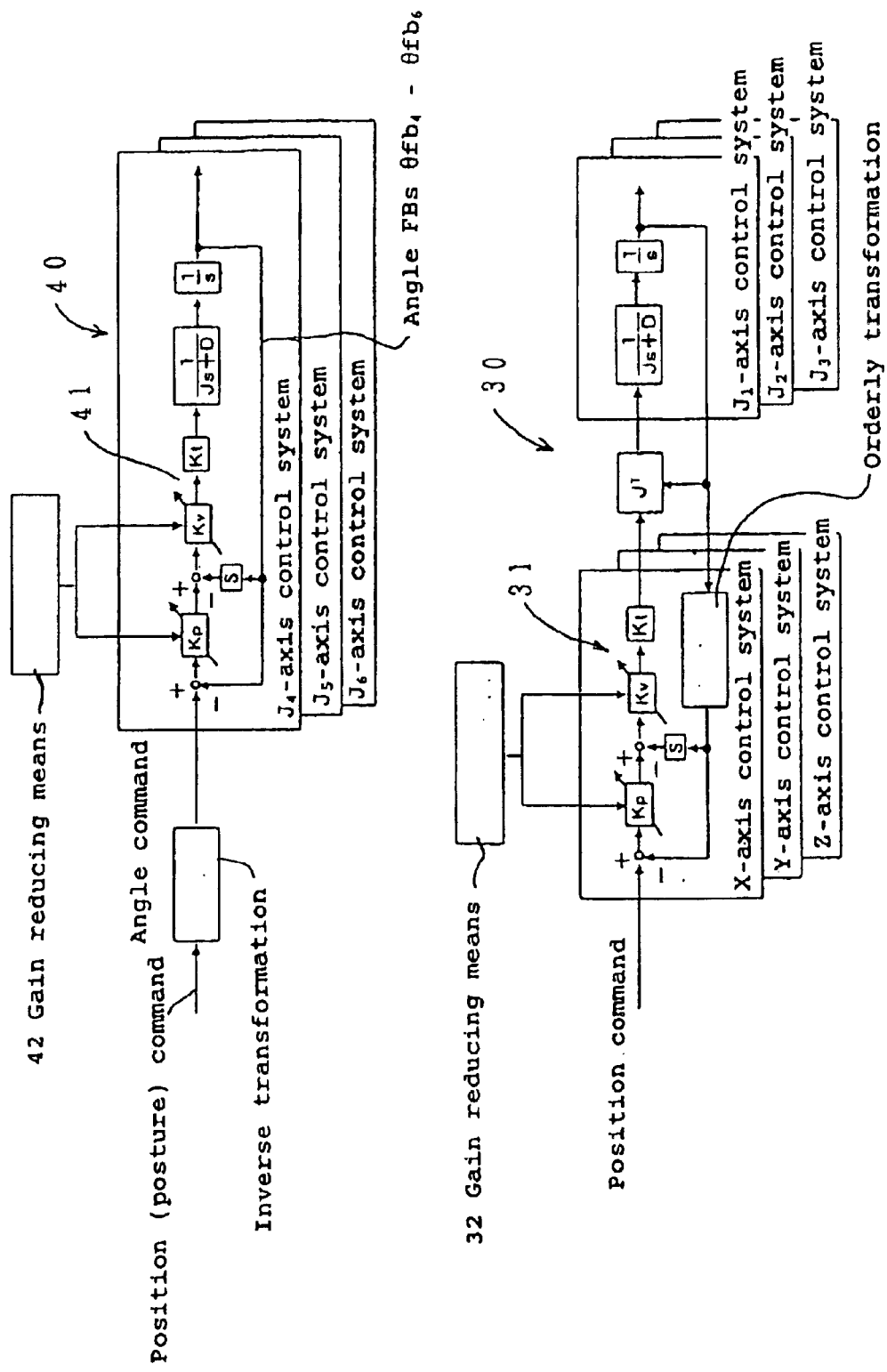
FIG. 10 is a block diagram showing a third concrete example of the present invention.

Now, a construction of a control system which has been applied to an actual robot is shown in FIG. 10, whereby actions of respective elements will be described.

The degree of freedom of joints of a robot is provided as 6, separate control methods are activated between the $J_1$–$J_3$ axes and $J_4$–$J_6$ axes. In the $J_1$–$J_3$ axes which control the position of a P point in a task coordinate system, a position/speed loop 31 of a task coordinate system 30 is constructed. In the $J_4$–$J_6$ axes which control the posture of a tool in a task coordinate system, a position/speed loop 41 of a joint coordinate system 40 is constructed. By thus separating control between the position and posture, flexible translational motion can be executed by position control and a correction of a change in posture of the tool can be executed by posture control.

(1) In order to construct a position/speed loop 41 of a task coordinate system, a position (angle) FB (a detection values) concerning the P point in the task coordinate system are determined by utilizing an orderly transformation formula based on angle detection values $\theta fb_1$–$\theta fb_3$ of the $J_1$–$J_3$ axes.

(2) Based on the position command and position FB in a task coordinate system, a position/speed control loop 31 is constructed in the X-, Y-, and Z-axis directions of the task coordinate system. Herein, the output value of the position/speed control loop 31 of the task coordinate system becomes a force command [$F_X$, $F_Y$, $F_Z$] in the X-, Y-, and Z-axis directions in the task coordinate system. The position/speed control loop 31 of the task coordinate system reduces, by means of a gain reducing means 32, the position loop gain and speed loop gain of a control system in terms of any of the X, Y, and Z axes to become lower than the position gains or speed gains of other axes. Alternatively, the power command itself is narrowed down small by providing a limit at the rear end of the speed control system.

(3) Then, a static correspondence formula between a joint coordinate system and a task coordinate system is determined based on robot angle FBs $\theta fb_1$–$\theta fb_3$, and by utilizing a transposed determinant thereof, a torque command in a joint coordinate system of the $J_1$–$J_3$ axes is calculated based on the force command of the task coordinate system.

(4) By controlling a motor of each joint by means of this torque command, flexible translational motion of the P point in the task coordinate system becomes possible. At this time, static loads including gravity are to be separately compensated.

Now, a motion example where the present control method has been applied to a six-degree-of-freedom robot will be described with reference to FIG. 6.

It is presumed that flexible transnational motion of the P point is performed in the Z-axis direction of a task coordinate system. The position gain and speed loop gain of the Z-axis control system of a task coordinate system are reduced, by means of a gain reducing means, to become lower than the position gains and speed gains of other axes. Thereby, the position of the P point can flexibly move in the Z-axis direction, whereas in the X- and Y-axis directions, the position/speed loop of a task coordinate system works with high rigidity, and as a result, force is generated so as to prevent a deviation from occurring and motion is limited.

The P point as the center of wrist axes moves, because of functions of a position/speed loop of the task coordinate system, in only the vertical direction (Z-axis direction) due to action of the external force, and therefore shifts along the dotted lines shown in the drawing. The P point shifts downward, whereby the angle of the wrist axis (herein, the $J_5$ axis) becomes as shown by the dotted lines. However, by teaching ?$J_5$ according to a shift of the P point, the tool shifts in parallel in the vertical direction while keeping the tool initial posture with respect to a robot base. Namely, the tool also shifts along the dotted lines in the drawing.

Figure 11:
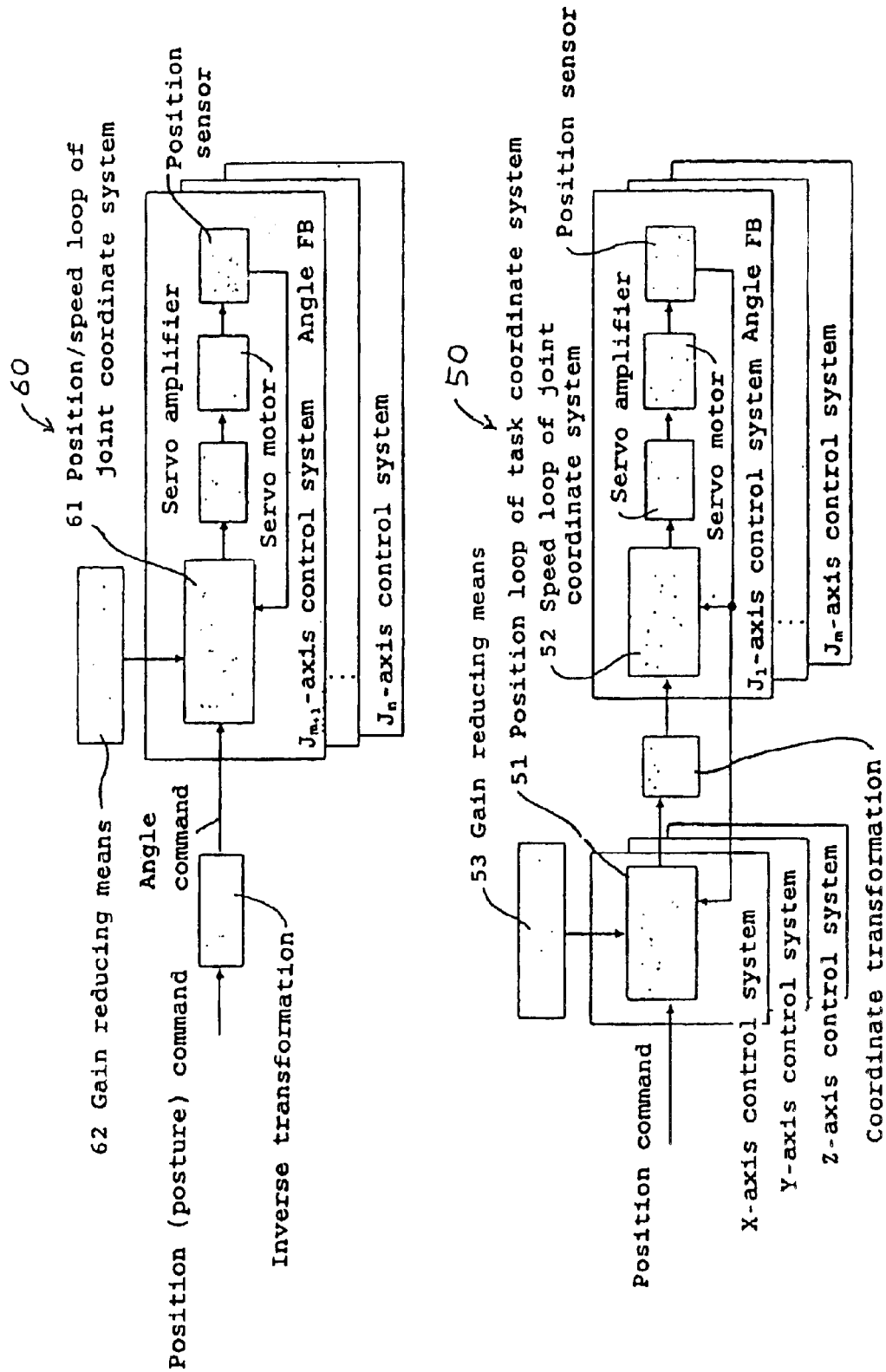
FIG. 11 is a block diagram showing a basic construction of a fourth means of the present invention.

Now, a fourth concrete example of the present invention will be described by showing the same in FIG. 11.

First, a construction of a position/speed control loop of each joint in the present invention will be described.

The degree of freedom of joints of a robot is provided as n. Of these, a control system 50 of the axes $J_1$–$J_m$ from the base of the robot to the m-th axis (hereinafter, referred to as basic axes) is constructed by a position loop 51 of a perpendicular coordinate system and a speed loop 52 in a joint coordinate system. In addition, a control system 60 of m+1-th to n-th axes $J_{m+1}$–$J_n$ (hereinafter, referred to as wrist axes) is constructed by a position/speed loop 61 of a joint coordinate system.

Similar to the third concrete example, component means of the perpendicular coordinate system determines a position (angle) FB concerning the P point in a task coordinate system based on an angle detection value of each joint of the basic axes. Based on this position FB and a position command of the P point in a task coordinate system, a position control loop 51 is constructed in the X-, Y-, and Z-axis directions of the task coordinate system. Herein, an output value from the position control loop 51 of the task coordinate system becomes a speed command in the X-, Y-, and Z-axis directions in the task coordinate system. The position control loop 51 of the task coordinate system reduces, by means of a gain reducing means 53, the position loop gain of any control system of the X, Y, and Z axes to be lower than the position gains of other axes. Alternatively, the speed command itself may be narrowed down small by providing a limit at the rear end of the position control system, which is not illustrated. In such a case where the control system is set low in rigidity, static loads including gravity are to be separately compensated.

Then, based on the current state of the robot, a static correspondence formula of minute displacement between a joint coordinate system and a task coordinate system as a transposed matrix of a matrix, which is generally referred to as Jacobian, is calculated, and based on a speed command of the task coordinate system, a speed command in the joint coordinate system can be calculated.

For example, in terms of a three-degree-of-freedom robot, a calculation formula for a Jacobian inverse determinant can be expressed by the following formula.

$$J^{-1} = \begin{pmatrix} {}^0s_1 \times ({}^0P_1 - {}^0P_1), & {}^0s_2 \times ({}^0P_1 - {}^0P_2), & {}^0s_3 \times ({}^0Pr - {}^0P_3) \\ {}^0s_1, & {}^0s_2, & {}^0s_3 \end{pmatrix}^{-1} \quad (9)$$

A speed command of the task coordinate system is $$V = [V_X, V_Y, V_Z]^T \quad (10)$$

Herein,

V: Speed command vector
$V_X, V_Y, V_Z$: Speed command in the task coordinate system A joint angle command transformed into a joint coordinate system is $$v = [V_1, V_2, V_3]^T \quad (11)$$

Herein, where

V: Speed command vector in the joint coordinate system
Vi: Speed command of an i-th axis joint coordinate system is provided, a speed command in the joint coordinate system can be determined based on the following relationship.

$$v = J^{-1}V \quad (12)$$

Accordingly, in response to a change in posture of the robot, a calculation of formulae (9) and (12) is carried out, and based on a speed command in a joint control system expressed in formula (11) and a speed FB determined through an angle detection of each joint, speed feedback control of the joint coordinate system is performed, thus a torque command in the joint coordinate system is determined. A position control loop of the joint coordinate system of the wrist axis is provided similarly to that of the third concrete example.

Figure 12:
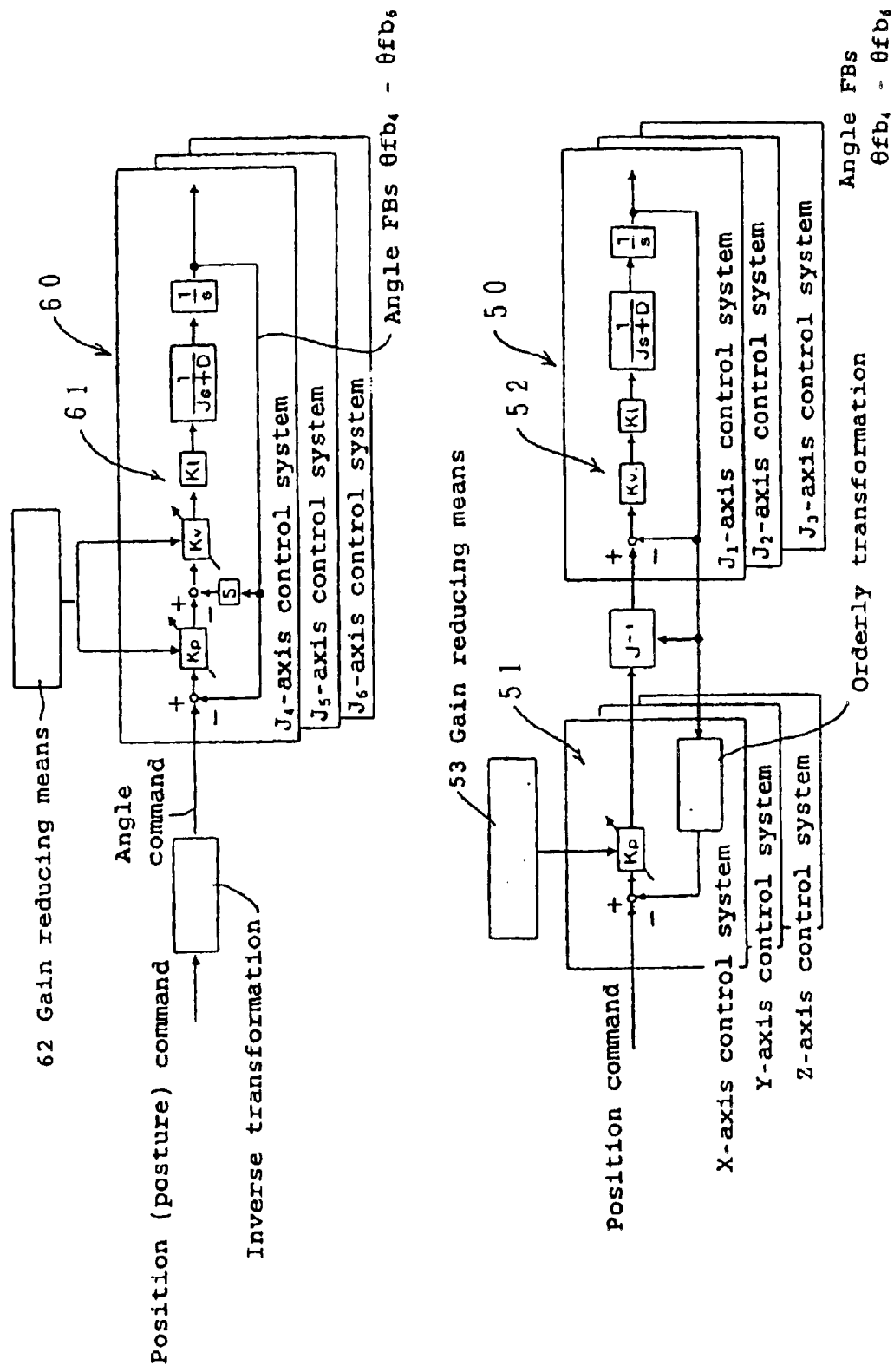
FIG. 12 is a block diagram showing a fourth concrete example of the present invention.
Figure 13:
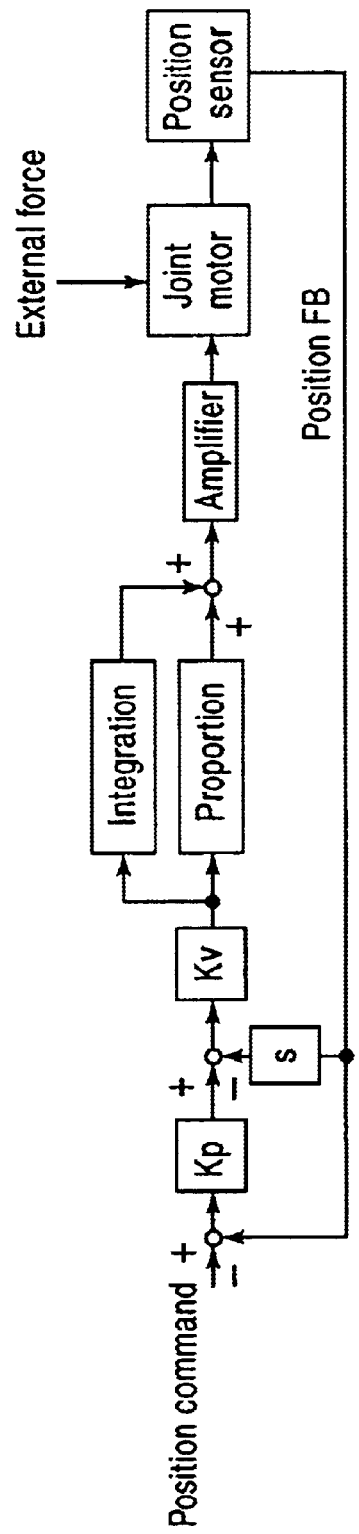
FIG. 13 is a block diagram showing a prior-art control method.

Now, a construction of a control system which has been applied to an actual robot is shown in FIG. 12, whereby actions of respective elements will be described.

The degree of freedom of joints of a robot is provided as 6, separate control methods are activated between the $J_1$–$J_3$ axes and $J_4$–$J_6$ axes. In the $J_1$–$J_3$ axes which control the position of a P point in a task coordinate system, a position loop 51 of a task coordinate system and a speed loop 52 in a joint coordinate system are constructed. In the $J_4$–$J_6$ axes which control the posture of a tool in a task coordinate system, a position/speed loop 61 of a joint coordinate system is constructed. By thus separating control between the position and posture, flexible translational motion can be executed by position control and a correction of a change in posture of a tool can be executed by posture control.

(1) In order to construct a position/speed loop of a task coordinate system, a position FB (a detection value) concerning a P point in a task coordinate system is determined by utilizing an orderly transformation formula based on angle detection values $\theta fb_1$–$\theta fb_3$ of the $J_1$–$J_3$ axes.

(2) Based on the position command and position FB in the task coordinate system, a position/speed control loop is constructed in the X-, Y-, and Z-axis directions of a task coordinate system. Herein, the output value of the position/speed control loop of the task coordinate system becomes a speed command $[V_X, V_Y, V_Z]$ in the X-, Y-, and Z-axis directions in the task coordinate system. The position/speed control loop of the task coordinate system reduces, by means of again reducing means 53, the position loop gain and speed loop gain of a control system in terms of any of the X, Y, and Z axes to become lower than the position gains or speed gains of other axes. Alternatively, the power command itself is narrowed down small by providing a limit at the rear end of the position control system.

(3) Then, a correspondence formula of minute displacement between a joint coordinate system and a task coordinate system is determined based on robot angle FBs $\theta fb_1$–$\theta fb_3$, and by utilizing an inverse determinant thereof, a speed command in the joint coordinate system of the $J_1$–$J_3$ axes is calculated based on the speed command of the joint coordinate system of the $J_1$–$J_3$ axes.

(4) By means of this speed command and the angle detection value, a speed control loop 52 in a joint coordinate system 50 is constructed, and a torque command is calculated. By controlling a motor of each joint by means of this torque command, flexible translational motion of the P point in a task coordinate system becomes possible. At this time, static loads including gravity are to be separately compensated. In the above calculations, for the axes composing a robot, a task coordinate system is constructed in terms of the wrist position so that flexible translational motion is performed, therefore, the volume of calculation is small and it is possible to find a solution in real time.

As has been described above, according to the present invention, the following effects can be provided.

(1) The control system of each joint is allotted to a conventional high-rigid position/speed loop and a low-rigid position/speed loop, and based on a joint angle displaced in the low-rigid joint axis due to external force and the initial posture of a tool stored in advance, an angle correction to the high-rigid joint axis is calculated in real time so that the tool posture with respect to a robot base can be kept. Thereby, flexible translational control wherein no special tool or force sensor is necessary, the volume of calculation is remarkably small, and the tool posture in a task coordinate system is kept can be performed.

(2) Mechanical structures including a force sensor and a slider, which have been necessary in the past, become unnecessary, weight capacity of a robot is not reduced, teaching work becomes easy, and flexible translational control can be extremely easily performed.

(3) Furthermore, a position/speed state feedback loop is constructed in a joint coordinate system and a task coordinate system, respectively, and outputs from both control systems are combined by means of a static correspondence formula between a joint coordinate system and a work coordinate system using information concerning the point of a joint angle. Thereby, with respect to force exerted from the outside, motion of the end at a working position can be accurately limited in only a specific direction on a task coordinate system, therefore, while the initial posture of a tool with respect to the robot base is kept, flexible translational control can be easily realized by solving an extremely simple calculation.

(4) Moreover, the control system of each joint of a robot is allotted to a feedback loop in a task coordinate system for controlling the position of a wrist and a feedback loop in a joint coordinate system for controlling the posture of a wrist, and the gains of a specific axis in a task coordinate system are reduced or a limit is provided. Thereby, no special tool or force sensor is necessary, the volume of calculation is remarkably small, and flexible translational control in a task coordinate system can be performed.

INDUSTRIAL APPLICABILITY

The present invention is useful as a robot controller for performing flexible translational motion while keeping the tool posture with respect to the robot base in a task coordinate system by simple processing.

What is claimed is:

1. A robot controller for controlling a motor for driving joint by means of a control circuit having a position/speed state feedback loop comprising:

means for measuring the angle of a joint of a robot, means for storing the initial posture of a tool attached to the end of a hand of the robot, means for setting the position or speed gain of a specific joint axis smaller than the position or speed gains of other joint axes, and means for calculating the correction of a position or speed command to keep the tool posture with respect to the robot base on the basis of said angle of the join and said initial posture of the tool.

2. A robot controller for controlling a motor for driving a joint by means of a control circuit having a position/speed state feedback loop comprising:

means for measuring the angle of a joint of a robot, means for storing the initial posture of a tool attached to the end of a hand of the robot, means for calculating a static correspondence between two coordinate systems based on said joint angle, means for performing second position/speed feedback control based on said joint angle and a position command in a robot task coordinate system in addition to the control circuit, means for setting the position or speed gain of a specific axis in a second feedback control system smaller than the position or speed gains of other joint axes, means for transforming an output value from said second feedback control system to a joint angle torque value by utilizing said static correspondence, means for adding the joint angle torque value of said second feedback control system to an output value from a first feedback control system, and means for calculating the correction of a position or speed command to keep the tool posture with respect to the robot base on the basis of said angle of the join and said initial posture of the tool.

3. The robot controller as set forth in claim 1 or 2, wherein, means for providing a torque limit after a speed controller is provided instead of setting the position gain or speed gain of said specific joint axis small.

4. A motor controller for controlling the wrist position and posture of a robot comprising:

means for performing control of said wrist position by means of a task coordinate control system which performs by reference to a task coordinate system; and means for performing control of said wrist posture by means of a joint coordinate control system.

5. The robot controller as set forth in claim 4, wherein said task coordinate control system comprises:

means for measuring the angle of a joint of a robot, means for calculating a static correspondence between the coordinate systems based on said joint angle, means for performing position and speed state feedback control based on said joint angle and a position command in a robot task coordinate system in a task coordinate system, and means for transforming an output value from said feedback control system to a joint angle torque value of a joint coordinate system by utilizing said static correspondence.

6. The robot controller as set forth in claim 5 wherein, means for setting the position or speed gain of a specific axis in position/speed state feedback control of said task coordinate system smaller than the position or speed gains of other axes is provided.

7. The robot controller as set forth in claim 5, wherein, means for providing a limit after a speed controller is provided instead of setting the position or speed gain of a specific axis in position/speed state feedback control of said task coordinate system smaller than the position or speed gains of other axes.

8. The robot controller as set forth in claim 4, wherein said task coordinate system comprises:

means for measuring the angle of a joint of a robot, means for calculating a correspondence of minute displacement between coordinate systems based on said joint angle, means for performing position state feedback based on said joint angle and a position command in a robot task coordinate system in a task coordinate system, means for transforming an output value from said position feedback control system to a speed command of a joint coordinate system by utilizing said correspondence of minute displacement, and means for performing speed state feedback control in a joint coordinate system based on said speed command and said joint angle.

9. The robot controller as set forth in claim 8, wherein means for setting the position gain of a specific axis in position state feedback control of said task coordinate system smaller than the position gains of other axes is provided.

10. The robot controller as set forth in claim 8, wherein means for providing a limit after a speed controller is provided instead of setting the position gain of a specific axis in position state feedback control of said task coordinate system smaller than the position gains of other axes.

* * * * *